United States Patent [19]

Christ et al.

[11] 4,310,204

[45] Jan. 12, 1982

[54] HYDROSTATIC SUPPORT APPARATUS

[75] Inventors: Alfred Christ, Zurich; Heinz Annen, Hägglingen, both of Switzerland

[73] Assignee: Escher Wyss Limited, Zurich, Switzerland

[21] Appl. No.: 123,043

[22] Filed: Feb. 20, 1980

[30] Foreign Application Priority Data

Feb. 26, 1979 [CH] Switzerland ............... 1856/79

[51] Int. Cl.³ .................. F16C 32/06; F16C 17/06
[52] U.S. Cl. ..................................... 308/9; 308/160
[58] Field of Search ............... 308/5 R, 9, 73, 160, 308/170

[56] References Cited

U.S. PATENT DOCUMENTS

| 3,782,793 | 1/1974 | Sinner | 308/160 |
| 3,791,703 | 2/1974 | Ifield | 308/73 |
| 3,994,367 | 11/1976 | Christ | 308/9 |
| 4,073,549 | 2/1978 | Christ et al. | 308/9 |
| 4,106,824 | 8/1978 | Meystre et al. | 308/9 |
| 4,113,325 | 9/1978 | Miller | 308/9 |

FOREIGN PATENT DOCUMENTS 1203842 9/1970 United Kingdom ........... 308/5 R

Primary Examiner—Richard R. Stearns
Attorney, Agent, or Firm—Robert A. Ostmann

[57] ABSTRACT

Hydrostatic support apparatus for a movable part comprises a bearing plate and a support member which are movable relatively to each other and to a base and define a pressure chamber. The plate has a bearing surface containing a bearing pocket connected by a choke bore with the pressure chamber, is urged toward the movable part by pressure in that chamber, and is urged toward the support member by a spring. The support member is urged toward the movable part by a second spring or by a second spring and a hydraulic cylinder. The construction enables the bearing plate to be resiliently pressed toward the movable part during normal operation, but causes retraction of that plate upon a loss of pressure in the pressure chamber, to thereby prevent wear.

8 Claims, 2 Drawing Figures

HYDROSTATIC SUPPORT APPARATUS

BACKGROUND OF THE INVENTION

The invention relates to a hydrostatic support apparatus for mounting a movable machine part, with a source support which comprises, on its bearing surface facing the movable machine part, at least one bearing pocket for the load-bearing pressure fluid, this pocket being supplied via a choke bore.

From U.S. Pat. No. 3,994,367, issued Nov. 30, 1976, a hydrostatic source support for mounting a moving machine part is known, which comprises a spring element.

The disadvantage of the known construction is that, if the supply of pressure fluid fails, the bearing surface of the source support is pressed against the surface of the moving machine part by the spring element, without any pressure fluid to create a gap between the two surfaces. Therefore, in such a case, wear of the bearing or contact surfaces is inevitable.

SUMMARY OF THE INVENTION

The aim of the invention is to avoid wear of the bearing or contact surfaces if the pressure fluid supply fails in a source support with pressure applied by a spring element.

According to the invention, this aim is achieved in a support apparatus of the kind described at the beginning in that the source support is mounted relative to the base by means of a spring element and comprises a support member and a bearing plate which comprises the bearing surface, the bearing pocket and the choke bore, and that the support member and the bearing plate are movable relatively to each other in the direction of support and together define a pressure chamber through which the load-bearing pressure fluid is passed to the choke bore, and that a spring is provided which pulls the bearing plate and the support member towards each other counter to the force produced by the pressure chamber, and that the displacement distance between the bearing plate and the support member is greater than the displacement distance between the support member and the base.

It is particularly advantageous if the effective area of the bearing surface of the bearing plate is the same size as the cross sectional area of the pressure chamber.

Advantageously, stops are provided which limit the displacement distance i.e. the free play between the bearing plate and the support member, and other stops are provided which limit the displacement distance between the support member and the base.

In order to keep the spring element small, it is advantageous to form the spring element by a mechanical spring and a hydraulic servomotor connected parallel thereto.

In order to enable the support apparatus to adapt to the movable machine part, it is advantageous if the bearing plate is constructed so as to be pivotable relatively to the support member and if the connection of the bearing plate to the support member via the spring has an articulation point.

BRIEF DESCRIPTION OF THE DRAWING

The invention is explained in more detail with reference to the drawings which show embodiments of the object of the invention, in simplified form. In the drawings.

DESCRIPTION OF THE PREFERRED EMBODIMENTS

Figure 1:
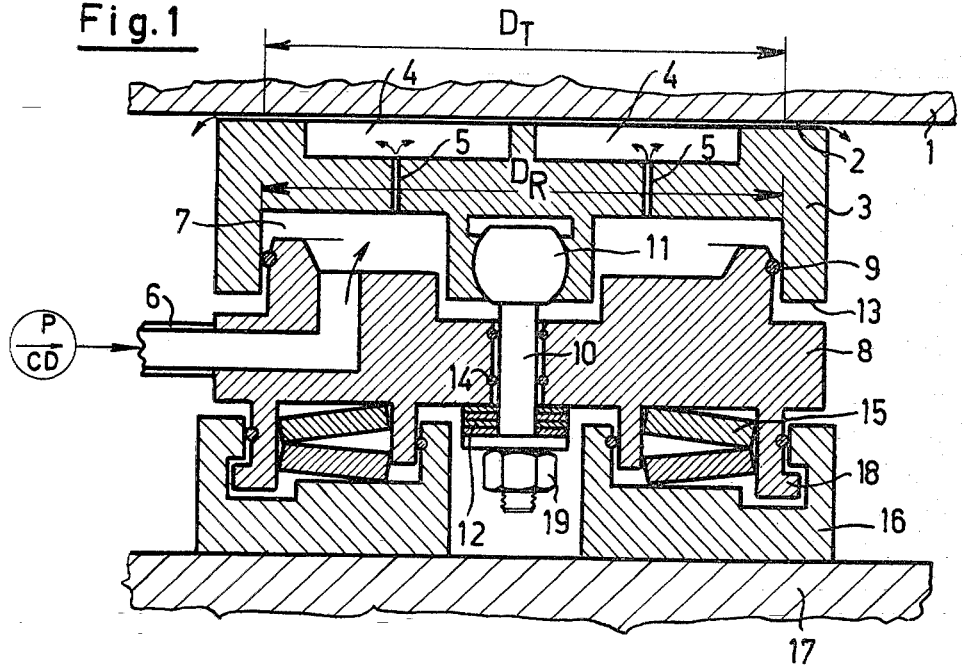
FIG. 1 is a section through a support apparatus.

In the support apparatus shown in FIG. 1, a contact surface 1 of a moving machine part is separated from a bearing plate 3 by a film of fluid 2. This thin film of fluid is maintained by feeding liquid from a volumetric pump at a constant feed volume into a bearing pocket 4 through choke bores 5, via a feed line 6 and a pressure chamber 7.

The pressure chamber 7 is closed off at the bottom by a support member 8 which bears a seal 9 which permits slight angular movement on all sides and displacement of the bearing plate 3. By means of a central bolt 10 with a ball-and socket joint 11, the bearing plate 3 is pulled down into the resting position, i.e. away from the contact surface, by means of circular springs 12, until it abuts on a stop 13. Seals 14 prevent pressure fluid from flowing out along the bolt 10. The support member 8 is supported, by means of spring elements 15, on a base 16 and a substrate 17. A stop 18 limits the displacement distance of the support member to both sides.

If there is no supply of fluid, the springs 12 pull the bearing plate 3 away from the contact surface 1 via the ball-and-socket joint 11. The withdrawal distance to the stop 13 is greater than the advancing distance of the spring element 15 to the upper end of the stop 18.

When liquid is delivered by the pump, a higher pressure is produced in the pressure chamber 7 than in the bearing pocket 4, owing to the throttling effect of the bores 5. The choke bores 5 are dimensioned so that this drop in pressure is amply sufficient to tense the springs 12 until the springs lie flat (position of abutment shown). A certain pressure prevails in the pockets 4, since the edge strips of the pockets defining the film of fluid 2 throttle the outflow of fluid. A pressure is created in the pressure chamber 7 which is always the same amount higher than the pressure in the pockets (constant flow by volume, thus constant drop in pressure between 7 and 4). The drop in pressure in the bores 5 and the spring force of the springs 12 are such that the force transmitted via the ball-and-socket joint 11 does not obstruct the angular mobility of the bearing plate 3 in its free self-adjustment in accordance with the contact surface 1.

Depending on the load on the contact surface 1, the spring elements 15 are compressed, thus giving the entire source support the required force-distance characteristics; on the other hand, the bearing plate 3 and the support member 8 remain braced in abutment. Only if the supply of liquid fails does the pressure loss in the bores 5 disappear, and hence the force which tenses the springs 12. These then pull the plate 3 back to the stop 13, i.e. into its resting position.

Adjustment of the source support to the correct operating height, or compensation of the load-bearing forces if several source supports are used in cooperation, can be effected by adjusting a bolt nut 19; the associated lock against turning of the nut is not shown.

In the embodiment the dimensions of the parts are chosen so that the cross sectional area of the pressure chamber 7 is the same size as the effective load-bearing surface of the bearing plate 3 (pressure in pocket x effective bearing surface-load-bearing force). In the drawing, the diameters of these surfaces are shown as identical in length, $D_R$ and $D_T$, respectively.

If the source support is dimensioned so that the effective surface of the bearing plate 3 is somewhat greater than the cross sectional area of the pressure chamber 7, i.e. if $D_T$ is greater than $D_R$, the force holding the springs 12 in abutment falls with the increasing pressure in the pockets 4, until, at a certain value, it is equal to zero. At this point, the springs 12 begin to pull back the bearing plate 3 so that the pressure in the pocket 4 does not increase further. This construction has the following advantage: the withdrawal mechanism also acts as a pressure limiting means. The pumps delivering the pressure fluid in this case do not have to be fitted with a pressure limiting device of their own.

Figure 2:
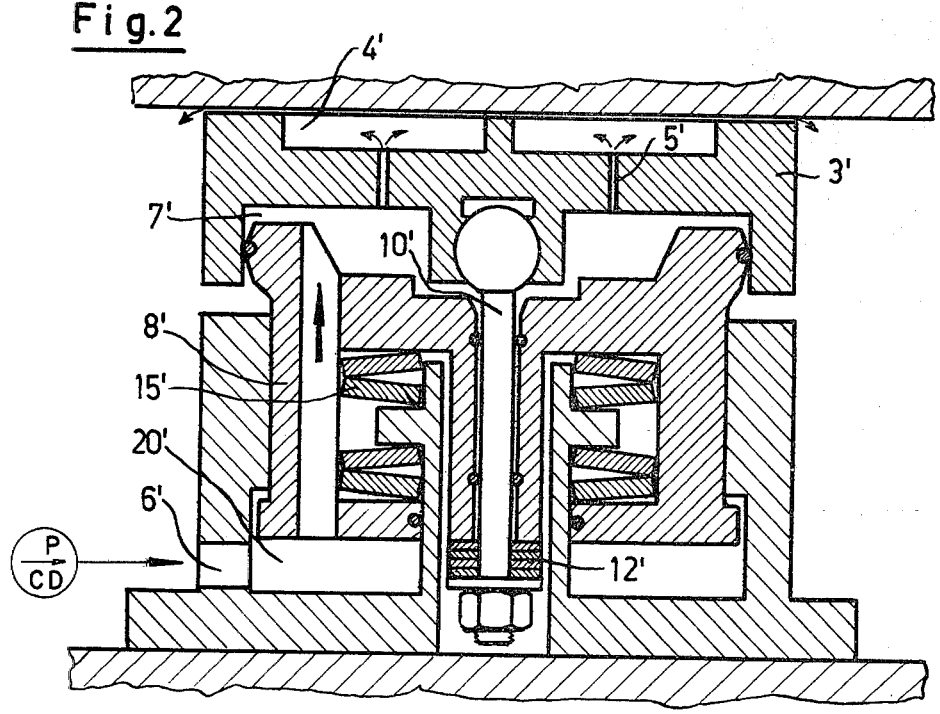
FIG. 2 is a section through another embodiment.

The embodiment in FIG. 2 differs from that in FIG. 1 substantially only in that the pressure fluid fed in through the line 6' is additionally passed into a pressure cylinder 20' which supports the support member 8' on the base 16'. Thus, the spring elements 15' need only take up a fraction of the entire load-bearing force of the source support.

In the embodiments, by way of example, cup springs are provided as the spring elements; however, it is also possible to use a hydraulic medium room connected to a gas store, for example, as the spring element.

The maximum pressure of the pressure fluid in the source support can be adjusted by altering the flow by volume of the pressure fluid. Similarly, the maximum pressure of the pressure fluid in the source support can be adjusted by altering the throttling characteristics of the choke bore 5.

We claim:

1. Hydrostatic support apparatus for supporting a movable machine part on a stationary machine base comprising a support member mounted for movement relatively to the base in the supporting direction; a bearing plate mounted for movement relatively to the support member in the supporting direction and defining therewith a pressure chamber, the bearing plate being urged toward the machine part by the pressure in that chamber; supply means for delivering pressure fluid to the chamber; a bearing surface on a side of the bearing plate facing the machine part and containing at least one bearing pocket; a choke bore connecting the bearing pocket with the pressure chamber; biasing means urging the support member toward the machine part; spring means urging the support member and the bearing plate toward each other; and stop means limiting the motions of the support member and the bearing plate in the supporting direction so that the range of motion between the plate and member is greater than the range of motion between the member and base, whereby the spring means is effective to retract the bearing plate from the machine part upon a loss of pressure in the chamber.

2. Hydrostatic support apparatus according to claim 1, wherein the effective area of said bearing surface of the bearing plate is the same size as the cross sectional area of said pressure chamber.

3. Hydrostatic support apparatus according to claim 1, wherein the effective area of said bearing surface of the bearing plate is somewhat greater than the cross sectional area of said pressure chamber.

4. Hydrostatic support apparatus according to claim 1, wherein said support member, said bearing plate and said spring means are constructed so as to allow pivotability between said bearing plate and said support member.

5. Hydrostatic support apparatus according to claim 1, wherein said biasing means comprises a mechanical spring.

6. Hydrostatic support apparatus according to claim 1, wherein said biasing means comprises a hydraulic pressure cylinder.

7. Hydrostatic support apparatus according to claim 1, wherein said biasing means comprises a mechanical spring element and a hydraulic pressure cylinder connected in parallel with each other.

8. Hydrostatic support apparatus according to claim 1, wherein said supply means comprises a source for delivering pressure fluid to the pressure chamber at a constant rate per unit of time.

* * * * *